(12) United States Patent
Aharon et al.

(10) Patent No.: US 12,283,880 B2
(45) Date of Patent: Apr. 22, 2025

(54) T-TYPE BUCK-BOOST RECTIFIER

(71) Applicant: Ariel Scientific Innovations Ltd., Ariel (IL)

(72) Inventors: Ilan Aharon, Ariel (IL); Aaron Shmaryahu, Jerusalem (IL)

(73) Assignee: Ariel Scientific Innovations Ltd., Ariel (IL)

( * ) Notice: Subject to any disclaimer, the term of this patent is extended or adjusted under 35 U.S.C. 154(b) by 0 days.

(21) Appl. No.: 18/280,714

(22) PCT Filed: Mar. 9, 2022

(86) PCT No.: PCT/IL2022/050266
§ 371 (c)(1),
(2) Date: Sep. 7, 2023

(87) PCT Pub. No.: WO2022/190097
PCT Pub. Date: Sep. 15, 2022

(65) Prior Publication Data
US 2024/0146185 A1    May 2, 2024

Related U.S. Application Data

(60) Provisional application No. 63/158,927, filed on Mar. 10, 2021.

(51) Int. Cl.
*H02M 1/42* (2007.01)
*H02M 1/14* (2006.01)
*H02M 7/217* (2006.01)

(52) U.S. Cl.
CPC ........... *H02M 1/4291* (2021.05); *H02M 1/14* (2013.01); *H02M 1/4225* (2013.01); *H02M 7/217* (2013.01)

(58) Field of Classification Search
CPC ....... H02M 3/158; H02M 7/217; H02M 7/219
See application file for complete search history.

(56) References Cited

U.S. PATENT DOCUMENTS

| 8,847,511 B1* | 9/2014 | Cheng | H05B 45/375 |
| | | | 315/246 |
| 2009/0103341 A1* | 4/2009 | Lee | B60W 10/26 |
| | | | 320/140 |

(Continued)

FOREIGN PATENT DOCUMENTS

| CN | 101789683 | 7/2010 |
| CN | 104702093 | 6/2015 |

(Continued)

OTHER PUBLICATIONS

Three-phase buck-boost PFC rectifier with common-mode free output voltage and low semiconductor blocking voltage stress. Minibock et al. Apr. 2019, IET (Year: 2019).*

(Continued)

*Primary Examiner* — Gustavo A Rosario-Benitez

(57) ABSTRACT

A T-type buck-boost power factor correction (PFC) rectifier (TBPR) comprises a power inductor, first and second storage capacitors, and first, second and third bi-directional switches. The first bidirectional switch connects a power supply input to a first end of the power inductor, the second bidirectional switch connects the first end of the power inductor to a first end of the first capacitor and the third bidirectional switch connects the first end of the power inductor to a first end of the second capacitor. At the same time, the second end of the first capacitor, the second end of the second capacitor and the second end of the power inductor are connected to a common node.

12 Claims, 11 Drawing Sheets

(56) References Cited

U.S. PATENT DOCUMENTS

| | | | | |
|---|---|---|---|---|
| 2011/0227418 A1* | 9/2011 | Pyboyina | ............ | H02J 9/062 |
| | | | | 307/75 |
| 2012/0086350 A1* | 4/2012 | Lin | ............ | H05B 41/2828 |
| | | | | 315/200 R |
| 2012/0155139 A1* | 6/2012 | Boeke | ............ | H02M 7/217 |
| | | | | 323/311 |
| 2015/0162822 A1* | 6/2015 | Ho | ............ | H02M 1/4225 |
| | | | | 363/89 |
| 2016/0344233 A1* | 11/2016 | Paatero | ............ | H02M 7/04 |

FOREIGN PATENT DOCUMENTS

| | | | | |
|---|---|---|---|---|
| CN | 107612326 | | 1/2018 | |
| CN | 110829838 | | 2/2020 | |
| CN | 111431394 | | 7/2020 | |
| DE | 102017118973 A1 * | 10/2018 | ............ | H02M 3/158 |
| KR | 10-1505556 | | 3/2015 | |
| WO | WO 2022/190097 | | 9/2022 | |

OTHER PUBLICATIONS

Supplementary European Search Report and the European Search Opinion Dated Jul. 11, 2024 From the European Patent Office Re. Application No. 22766529.6. (7 Pages).

Hsieh et al. "A Simple Bi-directional Bridgeless AC/DC Buck-boost Converter for Automotive Energy Harvesting", IECON 2014—40th Annual Conference of the IEEE Industrial Electronics Society, 1937-1943, Feb. 26, 2015.

Mohan et al. "Power Electronics: Converter, Applications and Design, Passage", Boost Converter, 81-90, Jan. 1, 1989.

Office Action Dated May 27, 2024 From the Israel Patent Office Re. Application No. 305796. (5 Pages).

International Search Report and the Written Opinion Dated Jun. 16, 2022 From the International Searching Authority Re. Application No. PCT/IL2022/050266. (10 Pages).

Haider et al. "Novel Single-Phase Buck+ Boost PFC Rectifier with Integrated Series Power Pulsation Buffer", 2019 10th International Conference on Power Electronics and ECCE Asia (ICPE 2019—ECCE Asia), 11 P., May 27-30, 2019.

Miniböck et al. "Three Phase Buck-Boost PFC Rectifier with Common Mode Free Output Voltage and Low Semiconductor Blocking Voltage Stress", IET Power Electronics, 12(8):2022-2030, Jun. 12, 2019.

Pires et al. "Three-Phase Single-Stage Four-Switch PFC Buck-Boost-Type Rectifier", IEEE Transactions on Industrial Electronics, 52(2): 1-10, Apr. 4, 2005.

Translation Dated Mar. 20, 2024 of Notification of Office Action Dated Mar. 13, 2024 From the National Intellectual Property Administration of the People's Republic of China Re. Application No. 202280031609.8. (2 Pages).

Notification of Office Action and Search Report Dated Mar. 13, 2024 From the National Intellectual Property Administration of the People's Republic of China Re. Application No. 202280031609.8. (7 Pages).

Notification of Office Action and Search Report Dated Nov. 20, 2024 From the State Intellectual Property Office of the People's Republic of China Re. Application No. 202280031609.8. (8 Pages).

Office Action Dated Jan. 1, 2025 From the Israel Patent Office Re. Application No. 305796. (4 Pages).

Translation Dated Dec. 16, 2024 of Notification of Office Action Dated Nov. 20, 2024 From the National Intellectual Property Administration of the People's Republic of China Re. Application No. 202280031609.8. (6 Pages).

\* cited by examiner

T-TYPE BUCK-BOOST RECTIFIER

RELATED APPLICATIONS

This application is a National Phase of PCT Patent Application No. PCT/IL2022/050266 having International filing date of Mar. 9, 2022, which claims the benefit of priority under 35 USC § 119(e) of U.S. Provisional Patent Application No. 63/158,927 filed on Mar. 10, 2021. The contents of the above applications are all incorporated by reference as if fully set forth herein in their entirety.

FIELD AND BACKGROUND OF THE INVENTION

The present invention, in some embodiments thereof, relates to a T-type buck-boost rectifier and, more particularly, but not exclusively, to a rectifier for lower voltage loads that retains the necessary power factor.

The power grid is the source of energy for domestic and industrial power systems. Many loads connected to the grid involve rectifiers which are designed to rectify the voltage from the grid into DC voltage. Power factor correction is a compulsory requirement of any electronic circuitry connected to the electrical grid, the rectifier that feeds the load must maintain a normal harmonic content and a power factor that match the standard.

While most electronic devices require low DC voltage supplement, the existing technology in the market is based on a step-up converter that supplies a high voltage DC bus. That is to say, most rectifiers today operate on a Boost-type converter topology with output voltage greater than 400V which is not suitable for most applications, and requires additional voltage conversions.

Rectifiers are a basic tool for delivering electrical energy from the electrical grid to the local consumer by converting alternating current (AC) to direct current (DC). All the power factor correction (PFC) rectifiers are based on the theoretical model of a loss free resistor (LFR). The LFR reflects a pure resistor to its input terminal and causes the sourced current to mimic the voltage shape and by that eliminate all current harmonics. Most of the switch mode power of the converter can act as a single-phase PFC rectifier. There are three possible power converters, which include a step down (buck), a step up (boost) and an inverting (buck-boost) power converter. The rectifier is required to operate continuously to eliminate all harmonics, and since the Grid voltage varies, the boost converter is the most common rectifier and the most common use is to force a minimum DC bus voltage of ~380V. The boost rectifier is highly efficient, of low cost and relatively simple. Nevertheless, a typical single-phase load requires a much lower voltage supply and consequently an additional conversion stage is required. As a result, the cost, volume, weight, and efficiency are negatively affected.

The buck rectifier is incapable of sustaining the necessary input current throughout an entire line cycle, and the buck-boost rectifier is much more versatile since it supports a voltage step-up and step-down and therefore a large output voltage range. Nevertheless, the buck-boost rectifier is relatively less efficient, and the inductor peak current is higher than in the case of the boost rectifier.

The Vienna rectifier introduces a new approach for three phase rectifiers. Compared with a conventional two-level converter system, the three-level Vienna rectifier reduces the voltage drop on power semi-conductors and the rated inductance power on the mains side. The three-level DC bus is more applicable for inverters since the three-level inverter is more efficient and provides better harmonics and immunity in comparison with two-level inverters. However, the Vienna rectifier output voltage is double the standard boost PFC rectifier with a −400V, 0V (neutral), +400V bus.

The Vienna converter as described may fit applications such as an inverter and high-power electric motors. Nonetheless, applications with low power motors such as air-conditioners, refrigerators, etc. may require lower amplitude sine waves, and the high voltage three-level DC bus reduces the resolution and therefore the accuracy of the inverter and may also harm the inverter efficiency, so that the Vienna rectifier is not the solution for lower power applications.

SUMMARY OF THE INVENTION

The present embodiments may provide a converter in Buck-Boost topology that allows any desired tri-level output voltage to be set while keeping a power factor close to 1. The rectifier may maintain an output voltage in a large operating range (between 50V-800V) and may operate in a continuous conduction mode (CCM) and discontinuous conduction mode (DCM) configuration. More particularly, a step up/step down three-voltage-level rectifier is presented. The topology of the present embodiments is based on the buck-boost converter.

According to an aspect of some embodiments of the present invention there is provided a T-type buck-boost power factor correction (PFC) rectifier (TBPR) for providing a low ripple DC output from a mains AC input, the TBPR comprising:
  a power inductor;
  first and second storage capacitors; and
  first, second and third bi-directional switches, the first bidirectional switch connecting a power supply input to a first end of said power inductor, the second bidirectional switch connecting said first end of said power inductor to a first end of said first capacitor and said third bidirectional switch connecting said first end of said power inductor to a first end of said second capacitor, said second end of said first capacitor, said second end of said second capacitor and said second end of said power inductor being connected to a common node.

In an embodiment, the power inductor is above a critical value, the TBPR thereby operating in a continuous conduction mode (CCM). By contrast, if the power inductor is below a critical value, the TBPR may operate in a discontinuous conduction mode (DCM). The two different modes may relate to the same devices under different conditions or to different devices.

In an embodiment, the TBPR may have a first control signal, the first control signal having a complement. The first bidirectional switch is governed by said first control signal and said second bidirectional switch is controlled by said complement of the first control signal, and said second bidirectional switch may be further constrained to operate only during a positive half of an input sine wave.

Additionally or alternatively, the TPBR may have a first control signal, the first control signal having a complement as above, and the first bidirectional switch is governed by said first control signal, the third bidirectional switch being controlled by said complement of the first control signal, and said third bidirectional switch being further constrained to operate only during a negative half of an input sine wave.

In an embodiment, said first control signal is produced by a pulsed width modulation (PWM) module.

An embodiment may have two voltage output levels, and other embodiments may have three voltage output levels.

In an embodiment, the output voltage is below 430 volts, and more particularly but not exclusively the output voltage is between 430 volts and 50 volts at a power factor close to unity, where the term close to unity may refer to within 10% or within 5% or within 2.5% or within 1.25% or within 1% or within 0.1%.

The invention further extends to domestic appliances and other devices requiring relatively low voltage DC inputs being connected to the rectified output of the above TPBR or including the above TPBR in their circuitry or to legacy devices modified with such a TPBR and the act of modification thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
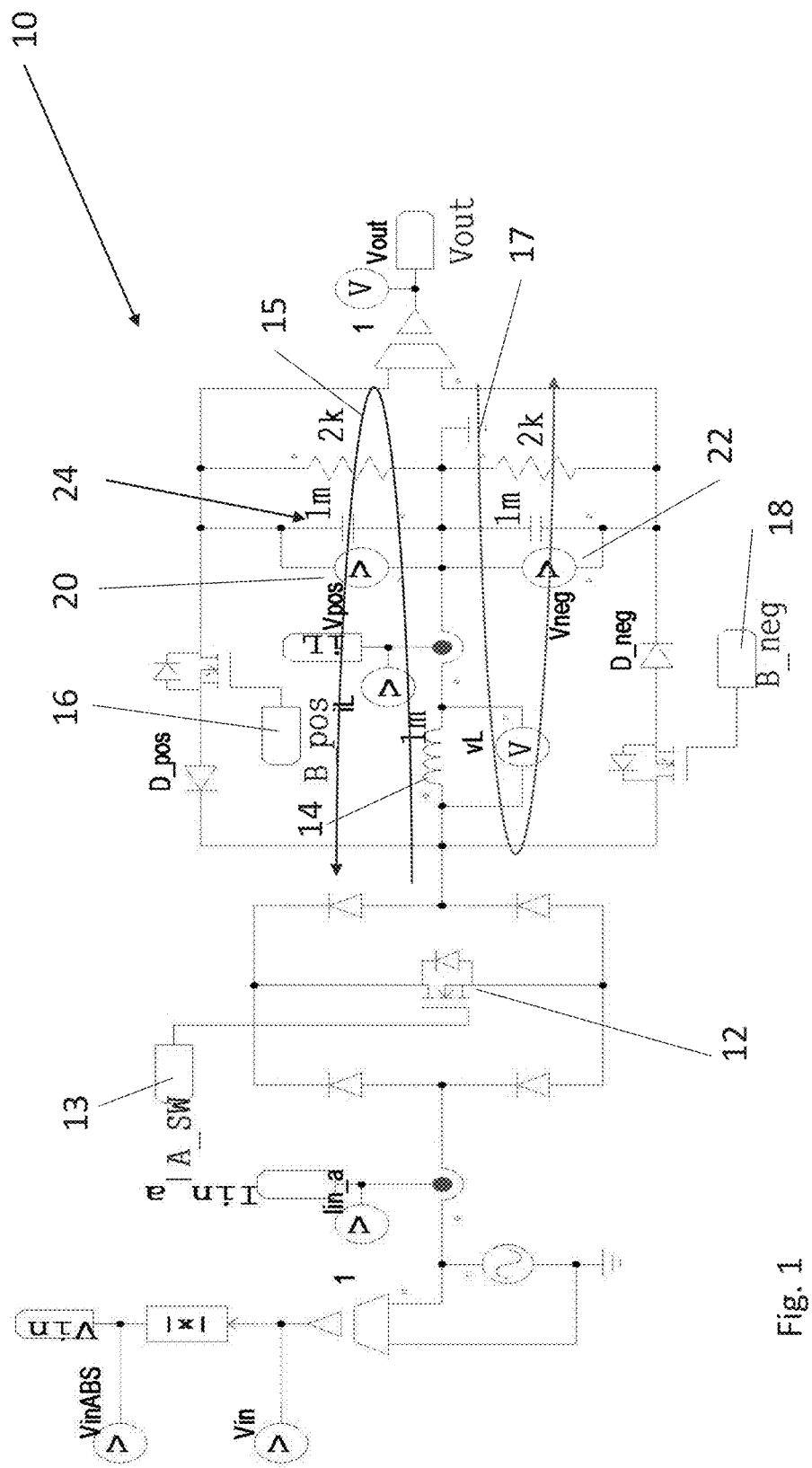
FIG. 1 is a schematic circuit diagram showing an embodiment of a TBPR according to the present invention.

The present invention, in some embodiments thereof, relates to a T-type buck-boost rectifier and, more particularly, but not exclusively, to a rectifier for lower voltage loads that retains the necessary power factor.

Most existing rectifiers for mains use are based on the topology of the Boost Rectifier, in which the output voltage of the rectifier's two voltage ranges lies within the limits of 380-430 VDC. In the case of an inverter, which is a rectifier having three voltage levels, the ranges lie within the limits of −430-0-+430 VDC.

The present embodiments may provide a T-type buck-boost power factor correction (PFC) rectifier (TBPR) having a power inductor, first and second storage capacitors, and first, second and third bi-directional switches. The first bidirectional switch connects a power supply input to a first end of the power inductor, the second bidirectional switch connects the first end of the power inductor to a first end of the first capacitor and the third bidirectional switch connects the first end of the power inductor to a first end of the second capacitor. At the same time, the second end of the first capacitor, the second end of the second capacitor and the second end of the power inductor are connected to a common node.

The present embodiments may provide a rectifier with a small volume and weight that operates at a high frequency capable of providing a wide voltage range at an output of 50-430 VDC without harmonies and with a normal power factor. The rectifier may support outputs ranging from a few tens to thousands of watts. The rectifier of the present embodiments may save an additional conversion stage that exists in most applications since its output voltage can be adjusted regardless of the grid voltage.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In the following the principle of operation of a rectifier according to the present embodiments is discussed, then an analysis of the rectifier of the present embodiments is made for continuous and discontinuous conduction modes, CCM and DCM. Then the proposed theory is validated in open loop, first in simulation and finally by experimental results. The innovative rectifier is suitable for any grid connected electronic device and specially for electronic inverters for residential motors.

The rectifier circuit is based on a Buck-Boost topology with the addition of elements that allow it to work as a grid rectifier. The output converter may consist of two or three voltage levels. An output of two levels is suitable for most uses, and most rectifiers on the market work at two voltage levels. The uniqueness of the topology of the present embodiments lies in the possibility of getting a large or small output voltage. Since most of the loads operate at a voltage lower than 400V, the proposed converter has a significant advantage over the common topology in Boost rectifiers that require an additional conversion rate from high voltage to low voltage.

In addition to the two-level case, there is increasing demand for a rectifier with three voltage levels, particularly for applications that require electrical motors, such as refrigerators, etc. In those applications there is a significant advantage to working with inverter technology since inverters allow for continuous operation alongside changing frequency, and hence significant energy can be saved in relation to the working method of the on/off switch. A three-level voltage inverter topology means that such a three Level Inverter may be connected directly to the rectifier and work at low frequency sine wave voltage waveforms without the need for additional conversion.

The working logic of a Buck-Boost T-type converter 10 according to a first embodiment of the present invention is shown in FIG. 1. In the positive half cycle the MOSFET 12 associated with the A_SW switch 13 starts to conduct, as a result the coil 14 starts to charge with the current coming from the source of MOSFET 12, and the resulting positive half cycle condition is called ON time. After a short time a second mode called OFF time starts. The OFF mode may be initiated by disconnecting the MOSFET A_SW switch 13 so that the coil 14 disconnects from the source. Parallel with this operation the circuit immediately turns on the MOSFET B_pos switch 16 to allow a discharge path to the coil 14, and the coil is discharged. The discharge path is indicated in the drawing by the black arrow trajectory 15. After a while, the system reconnects the MOSFET A_SW 13 switch and the cycle repeats. In the negative half cycle, as with the positive half cycle, the MOSFET A_SW 13 switch starts to conduct, as a result the coil starts to charge with the current from the source, again in ON time. After a short time the OFF time starts again. In the OFF mode, as the MOSFET A_SW 13 disconnects, the coil disconnects from the source. In parallel, the circuit immediately turns on the MOSFET B_neg switch 16 to allow a discharge path to the coil, and the coil discharges as indicated by discharge path 17.

The implementation of the timing logic for operating the various switches is correct both for continuous mode—current operation Continuous Conduction Mode (CCM) and for discontinuous mode operation—Discontinuous Conduction Mode (DCM). When the MOSFET A_SW 13 switch receives a positive PWM switching signal it becomes conductive, and when the switch receives a zero signal $\overline{PWM}$ it ceases to be conductive. In the positive half cycle, the MOSFET B_pos switch 16 conducts when receiving a signal $\overline{PWM}\&sign(v_S)$ in which the sign $sign(v_S)$ is an absolute value of the input signal so that it may only operate in positive wave mode and when the switch receives the signal PWM&sign($v_S$) then the MOSFET B pos switch does not conduct. In the negative half cycle the MOSFET B_neg switch 18 conducts when $\overline{PWM\&sign(v_S)}$ is issued and does not conduct under PWM&$\overline{sign(v_S)}$. The function of the MOSFETs switches B_pos, B_neg is to block unwanted currents in the positive 20 and negative 22 terminals of capacitor bank 24.

The T-type buck-boost PFC rectifier (TBPR) according to the present embodiments is a derivative of the inverting buck-boost converter.

In the following, first, the principle of operation and circuit analytics are introduced. Then the TBPR circuit is modeled and simulated to indicate circuit performance in open-loop. Finally, TBPR circuit experimental results are provided to validate the topology of the present embodiments.

Figure 2:
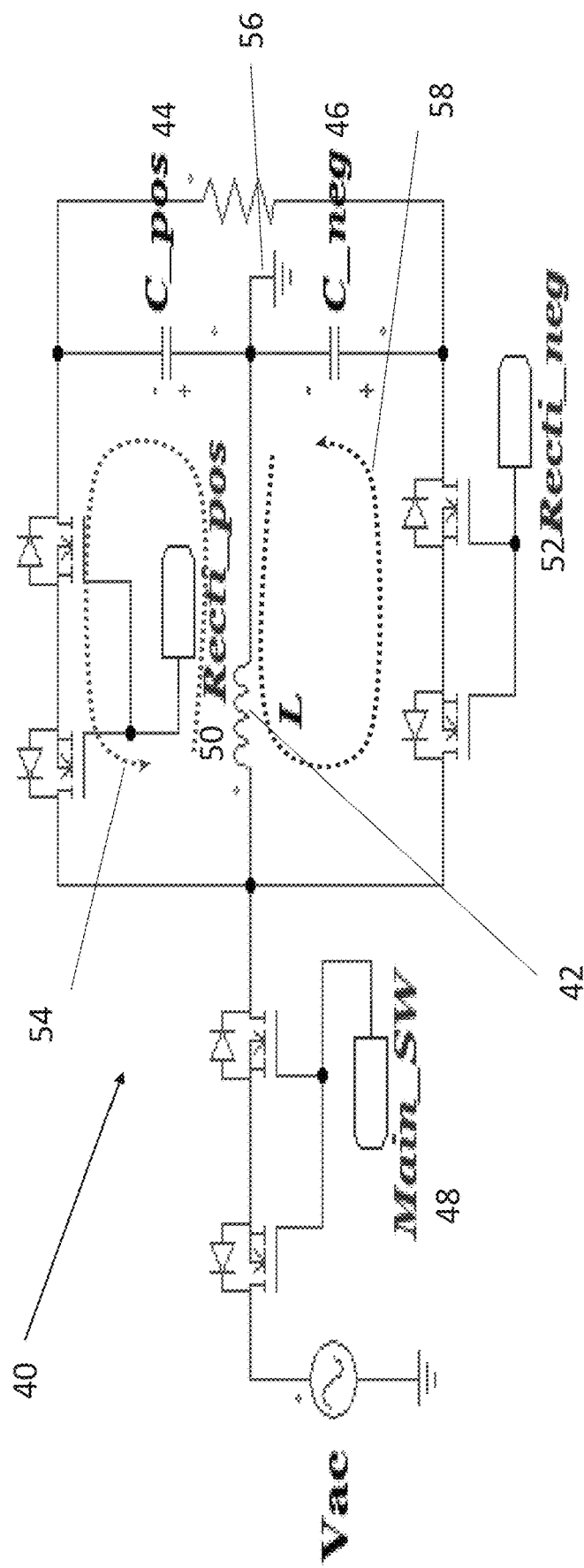
FIG. 2 is a simplified schematic diagram illustrating a single phase TBPR which is based on one power inductor, two storage capacitors and three bi-directional switches in accordance with embodiments of the present invention.

Reference is now made to FIG. 2, which is a simplified schematic diagram illustrating a single phase TBPR 40 which is based on one power inductor 42, two storage capacitors 44 and 46 and three bi-directional switches 48, 50 and 52. The first bidirectional switch 48 connects a power supply input 53 to a first end of the power inductor 42. The second bidirectional switch 50 connects the same first end of the power inductor 42 to a first end of the first capacitor 44, and the third bidirectional switch 52 connects the first end of the power inductor 42 to a first end of the second capacitor 46. At the same time the second end of the first capacitor 44, the second end of the second capacitor 46 and the second end of the power inductor 42 are connected to a common node, such as the neutral node or the earth node.

The TBPR 40 may operate in continuous conduction mode (CCM) and discontinuous conduction mode (DCM), as will be discussed below. The PFC basic rule is to modify the rectifier input impedance to a pure resistor. By doing so the input current follows Ohm's law and correlates with the input voltage shape. By preforming a specific switching procedure, as will be outlined in greater detail herein, the PFC power inductor may start to charge and discharge at different current levels wherein the overall current envelope shape is correlative to the input voltage sine wave. The inductor current behavior has a direct relationship with the inductance value. As the inductance rises, the interval current slope decreases and as the inductance decreases the interval current slope rises. By setting the interval length, that is by changing the switching frequency, and further varying the inductance value, the upper and lower inductor current boundaries are set. For low inductance and low frequency, the inductor current is fully discharged at each switching period, meaning that the inductor current starts and ends at zero current (e.g. FIGS. 6, 7). Since the current starts and ends at zero current, the operation is referred to as discontinuous conduction mode (DCM). When implementing higher inductance levels and higher switching frequency circuits the inductor current slopes are much more moderate and the inductor current does not reach zero (see for example FIGS. 10, 11). This kind of operation is named continuous conduction mode (CCM)

In CCM the TBPR control circuitry includes a cascade dual loop controller as described in greater detail with respect to FIG. 14 hereinbelow. A fast-inner inductor current loop initiates a pulsed width modulator (PWM) module and also initiates an outer slower voltage loop where the bandwidth is much smaller than the electricity grid frequency (BW<<$\omega_{Mains}$). The voltage controller output feeds a reference for the inductor current. The inductor current envelope shape follows the voltage which itself is a sine shape, and a multiplier is required (120 in FIG. 14). The voltage controller output is thus multiplied with a reference sine wave (122 in FIG. 14), thus creating the reference signal for the inductor current controller.

In DCM mode the control system is similar to the CCM mode with the exception that there is no need for a multiplier for the inductor reference signal since the buck-boost family operating in DCM mode has built-in self-PFC capabilities In DCM, the instantaneous inductor current is a function of a constant multiplied by the instantaneous input voltage signal (1), therefore the inductor envelop is correlated with the input sine wave.

$$i_{L,avg}(t) = \frac{D^2 \cdot T_S}{2 \cdot L} \cdot v_S(t) \tag{1}$$

In CCM the instantaneous inductor current is not correlated with the input sine wave. Hence, to create a sine envelop shape the current inductor reference is multiplied by a small signal sine wave 122 as presented in FIGS. 14 and 15 hereinbelow.

The principle of operation for the positive half sine wave includes two parts, one involving charging and the other discharging, of the power inductor.

Figure 3:
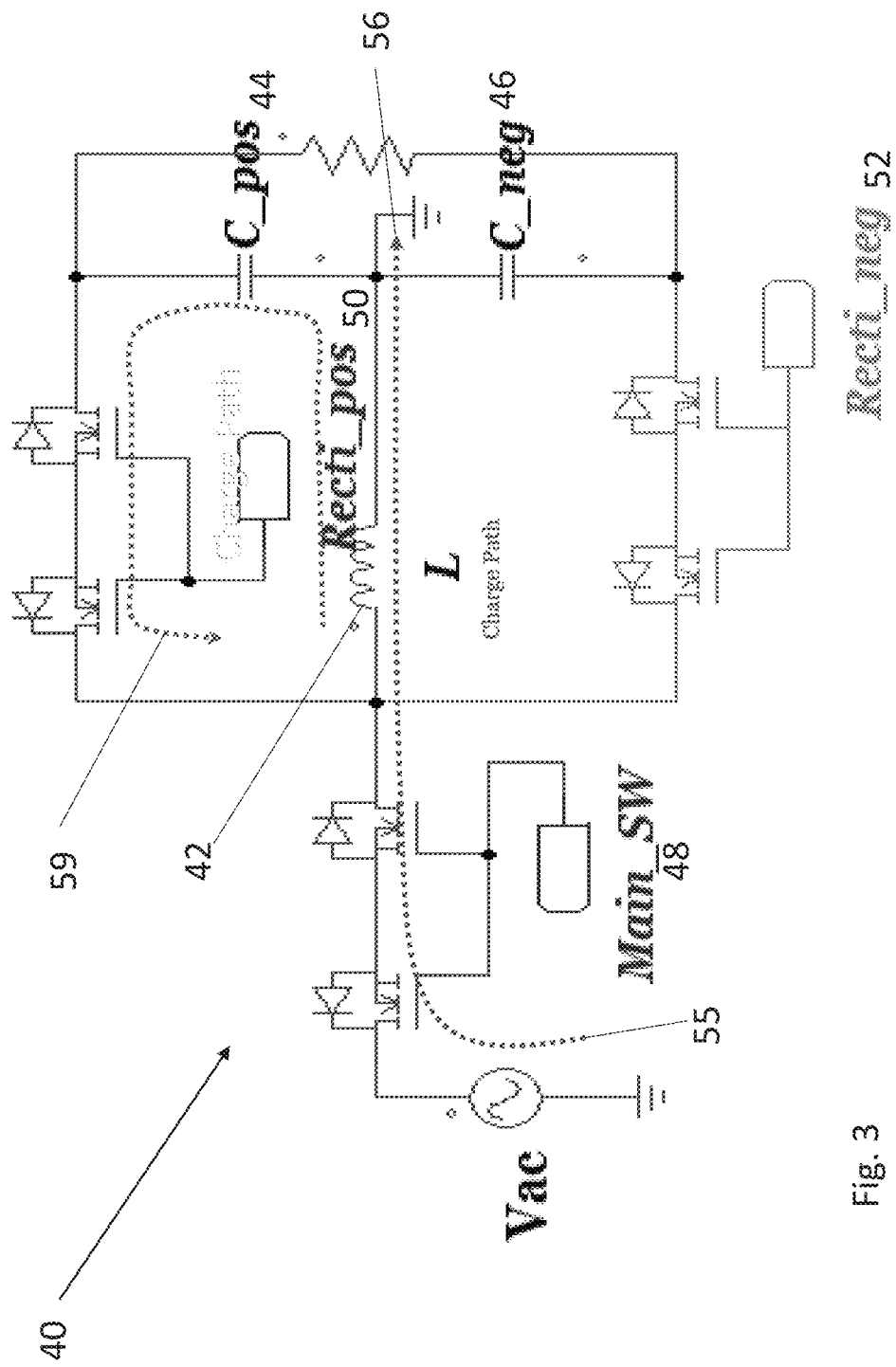
FIG. 3 is a simplified diagram showing discharge paths in operation of the TBPR of FIG. 2 for the positive half sine wave in accordance with embodiments of the present invention.

The charge path (arrow 55) begins in the AC source through the main switch 48, to the power inductor 42 and back to the neutral 56 as presented in FIG. 3. The discharge path 59 continues with the same current direction, discharging the inductor 42 throughout the positive capacitor 44 and the bi-directional rectifying positive switch 50. In the discharge period the positive capacitor (upper) is charged within the current flow direction as marked in FIG. 3. The logic signals for driving the switches are as follows, the main switch is governed by the signal PWM and the rectifying positive switch is governed by the complementary PWM signal under the condition of operating in the positive half of the sine wave $\overline{PWM}$ & sign($v_S$).

Figure 4:
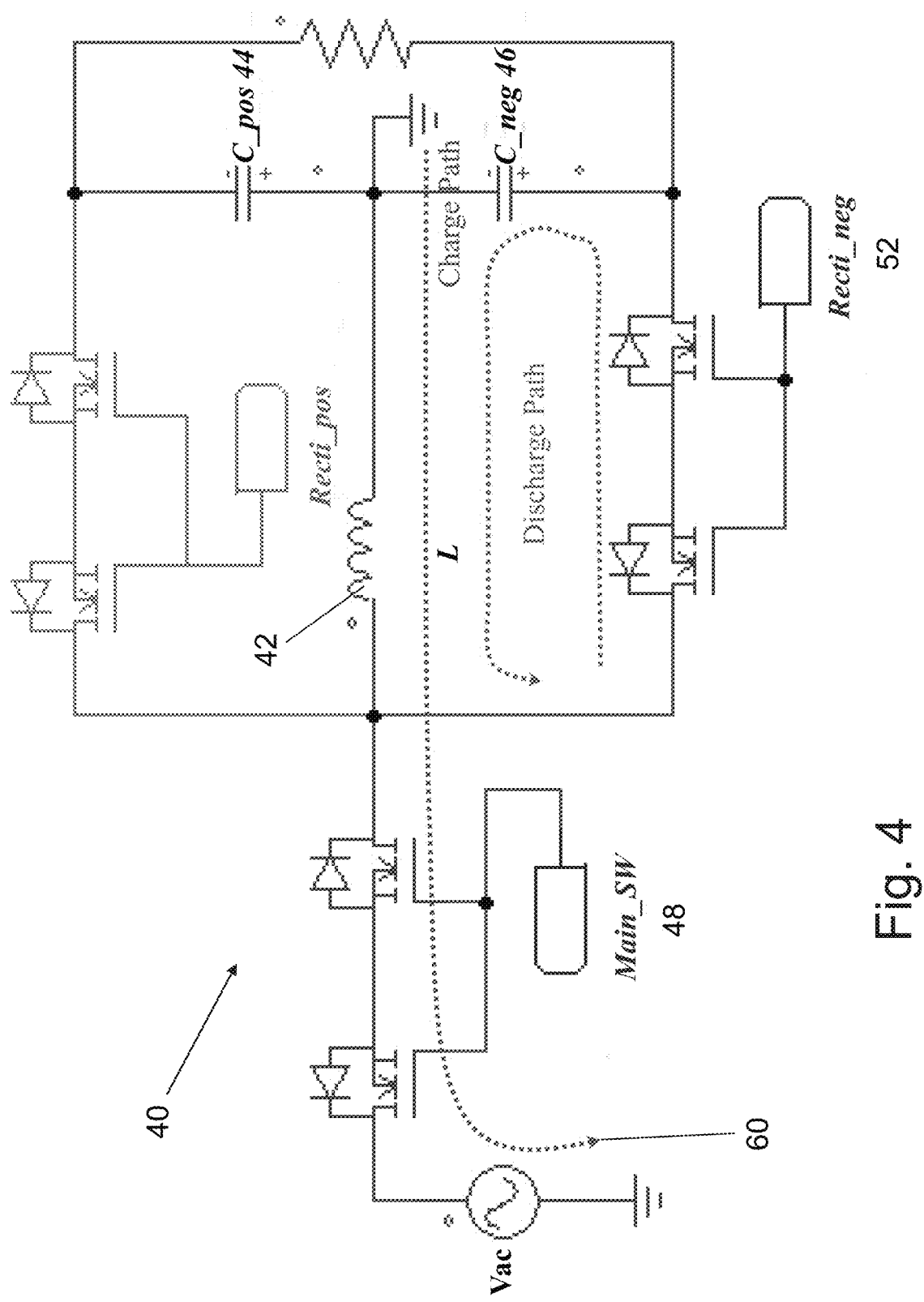
FIG. 4 is a simplified diagram showing discharge paths in operation of the TBPR of FIG. 2 for the negative half sine wave in accordance with embodiments of the present invention.

Reference is now made to FIG. 4, which illustrates the circuit of FIG. 2 during the negative half of the sine wave. The negative half sine wave procedure also includes two parts, namely charging and discharging of the power inductor 42. The charge path 60 begins in the AC source and passes through the main switch 48 to the power inductor 42 and back to the neutral terminal 56, in the same way as in the positive half sine wave and shown in FIG. 3.

The discharge path 62 maintains the same current direction, discharging the inductor 42 throughout the negative capacitor 46 and the bi-directional rectifying negative switch 52. During the discharge period the negative capacitor 46 is charged within the current flow direction as shown in FIG. 4.

The logic signals for driving the switches are as follows, the main switch is governing by the PWM signal and the rectifying negative switch is governing by the complementary PWM signal under the further condition of operating only in the negative half of the sine wave $\overline{PWM}$ & $\overline{sign(v_S)}$.

The analysis of TBPR 40 is carried out for two operational modes, CCM and DCM. In CCM the TBPR output voltage is in three level mode and the converter transfer function is $$\frac{V_O}{V_{S,rms}} = -\frac{D}{2 \cdot (1-D)} \tag{2}$$

where $V_o$ is the output load voltage,
$V_{S,rms}$ is the input electrical grid voltage or source voltage rms is the root means square voltage and
D is the rectifier duty-cycle. The inductor current ripple is derived from the voltage balance equation and from (2), where the current ripple is $$\Delta i_L(t) = \frac{2 \cdot V_O}{L \cdot f_{SW}} \cdot \frac{V_M |\sin(\omega t)|}{2 \cdot V_O + V_M |\sin(\omega t)|} \tag{3}$$

where $V_M$ is the electrical grid peak voltage,
L is inductance of the power inductor and
$f_{SW}$ is the switching frequency. Thus, the inductor average current is $$\langle i_L(t) \rangle_T = \frac{V_{S,rms}^2 \cdot I_{S,rms}}{V_O} \tag{4}$$

where $I_{S,rms}$ is the electrical grid rms current. Therefore, the inductor peak current is $$i_{L,M} = \frac{V_{S,rms}^2 \cdot I_{S,rms}}{V_O} + \frac{V_O}{L \cdot f_{SW}} \cdot \frac{V_M |\sin(\omega t)|}{2 \cdot V_O + V_M |\sin(\omega t)|} \tag{5}$$

and the minimum inductor for CCM is $$L_{min} > \frac{1}{2 \cdot \sqrt{2} \cdot f_{SW}} \cdot \frac{V_O}{I_O} \cdot \frac{|\sin(\omega t)|}{(\sqrt{2} \cdot V_O + V_{S,rms} |\sin(\omega t)|)} \tag{6}$$

As for DCM, since the TBPR shares the same characteristics as a buck-boost converter the input average current exhibits a perfect linear relationship with its input voltage given by $$i_L(t) = \frac{D}{2 \cdot L_{crit.} \cdot f_{SW}} \cdot V_M |\sin(\omega t)| \tag{7}$$

where $L_{crit.}$ is the critical mode inductance value.
From the input-output power equality, the average input current and (7), the inductor value is as indicated in (8)

$$L_{crit.} << \frac{D^2 (V_M |\sin(\omega t)|)^2}{8 \cdot f_{SW} \cdot P_{out}} \tag{8}$$

From power equality and (7) the converter transfer function is given by $$\frac{V_O}{V_{S,rms}} = \frac{D \cdot I_L}{2} \cdot \sqrt{\frac{R}{P_O}} \tag{9}$$

In any standard rectifier under the assumption of unity power factor the output capacitor value is set by the following rules of power equality $$p_s(t) = P_{dc} + p_c(t) \tag{10}$$

where $p_S(t)$ is the instantaneous input power,
$P_{DC}$ is the average load power and
$p_C(t)$ is the instantaneous capacitor power $$p_c(t) = P_{dc}\cos(2\omega t) \quad (11)$$

The capacitor energy balance is derived from (10) and (11)

$$E_c = E_0 - \frac{P_{dc}|\sin(2\omega t)|}{2\omega} \quad (12)$$

From (12) the capacitor value is given as:

$$C = \frac{P_{dc}|\sin(2\omega t)|}{2\cdot\omega\cdot\Delta v_{dc}\cdot V_{dc}} \quad (13)$$

where $\Delta v_{dc}$ is the capacitor voltage ripple. Nevertheless, the TBPR operating principle is similar to a single phase Vienna-rectifier. Each capacitor in the TBPR is charged in one half cycle only and supplies energy for an entire period as presented in FIG. 2. To fulfil the energy requirements both capacitors must contain a holdup energy for half cycle time.

$$C_{h.up} = \frac{P_{dc}}{4\cdot f_{grid}\cdot V_{dc}^2\cdot(\Delta v\%)} \quad (14)$$

where $f_{grid}$ is the electricity grid frequency and $\Delta v\ \%$ is the normalized capacitor ripple voltage.

It is possible to derive that $2\cdot f_{grid} << \pi\cdot f_{sw}$ and therefore $C_{h.up} >> C_{ripple}$ thus the output capacitors are set by $C_{h.up}$. Since a half cycle hold up energy is a standard requirement of any grid-connected system, the capacity of TBPR and any other rectifier are equal.

Based on the above, for any given frequency, when the inductance is above the critical value described in (8) the TBPR operating state is CCM, elsewise when the inductance is below the critical value the TBPR state is DCM.

Simulation and Experimental Results

Based on the above analysis, the TBPR circuit parameters for use in the present embodiments were designed for CCM and DCM. The simulation was made by the PSIM simulation tool operating at $f_{sw}=1$ MHz. For the CCM the input voltage was set to $V_s=230$ Vrms, and the output voltage of each state was set to 100V and therefore the load voltage is $V_{Load}=200$V.

Figure 5:
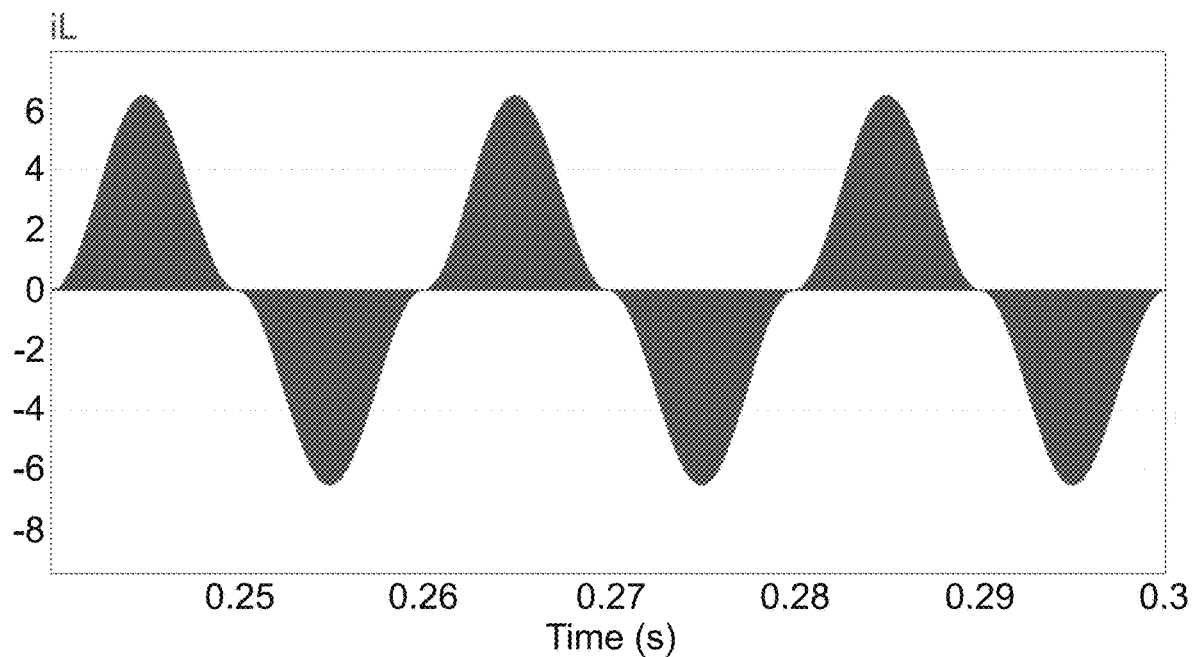
FIG. 5 is a simplified graph showing the envelope of the inductor current waveform in DCM in accordance with embodiments of the present invention.

By using (1) the duty ratio is D=0.456. The output current was set to $I_{Load}=2$ A. From equation (5) the critical inductor current is at $L_{Critical}=411.11$ nH and the inductor for satisfying CCM is chosen as $L_m=10$ µH. The output capacitors in the simulation were set to $C_{out}=100$ µF to satisfy the required output ripple voltage. The DCM operation in open loop presents a self-PFC since the inductor current envelope follows the input voltage sine wave as shown in FIG. 5.

Figure 6:
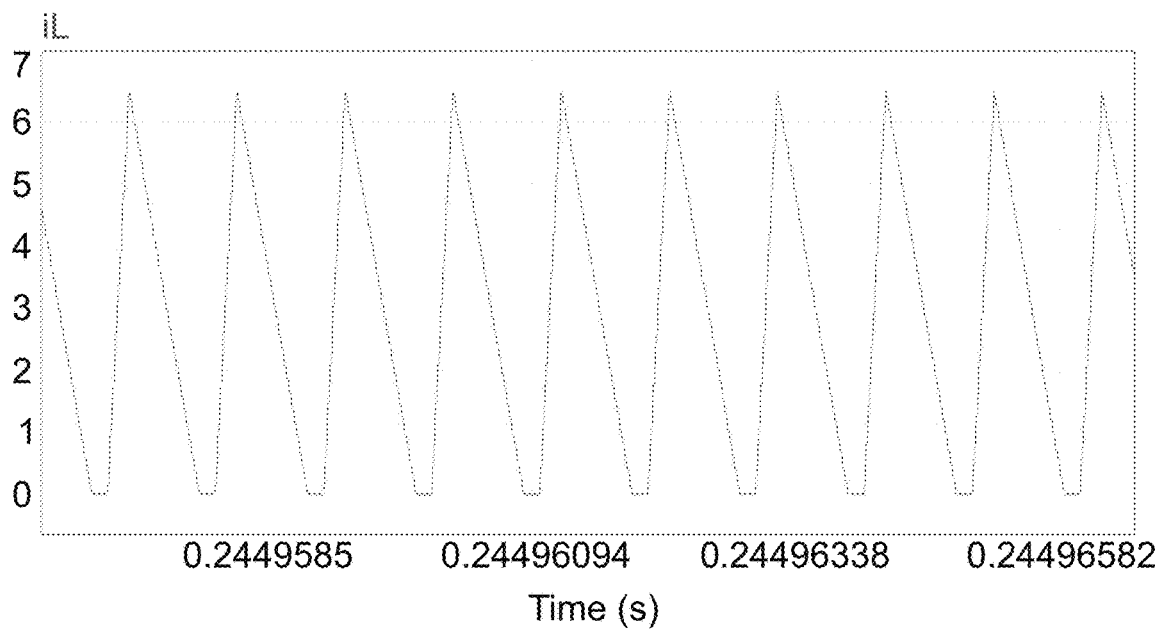
FIG. 6 is a simplified graph showing DCM positive half cycle inductor peak current in accordance with embodiments of the present invention.

The peak inductor current appears at the top of the positive sine wave and the inductor ripple is doubled with respect to the average current, as shown in FIG. 6.

Figure 7:
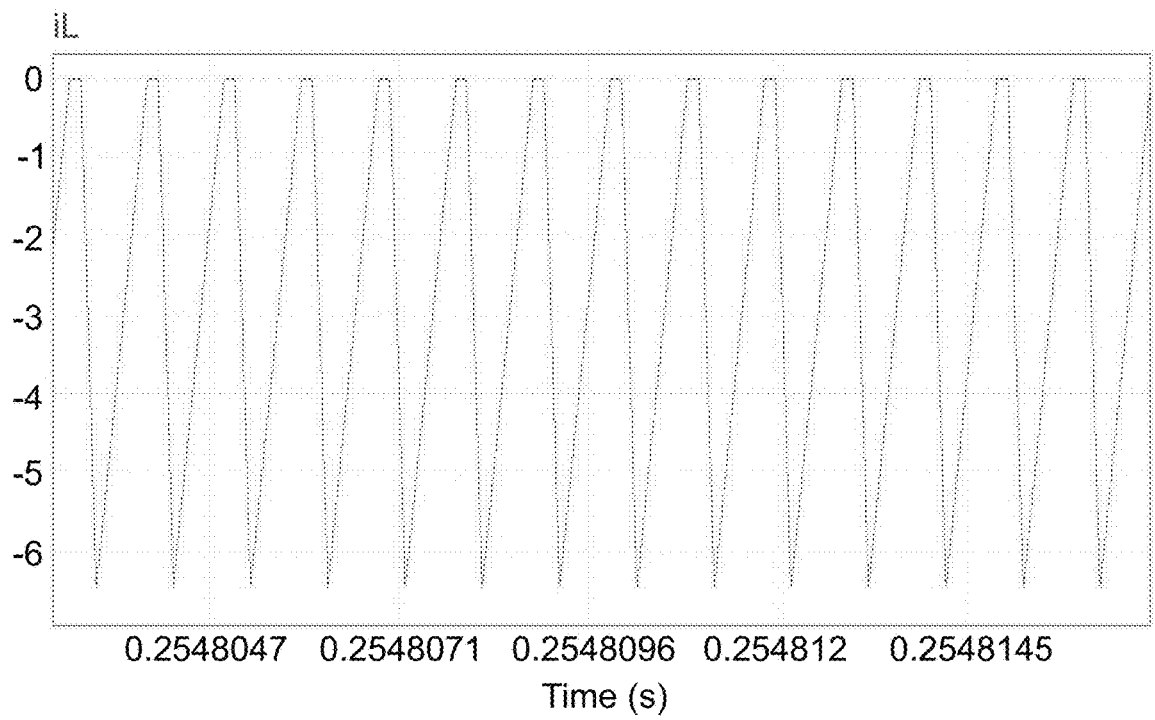
FIG. 7 is a simplified graph showing negative half cycle inductor peak current in DCM in accordance with embodiments of the present invention.

The negative half sine wave is a mirror of the positive half sine wave and the negative peak current is shown in FIG. 7.

Figure 8:
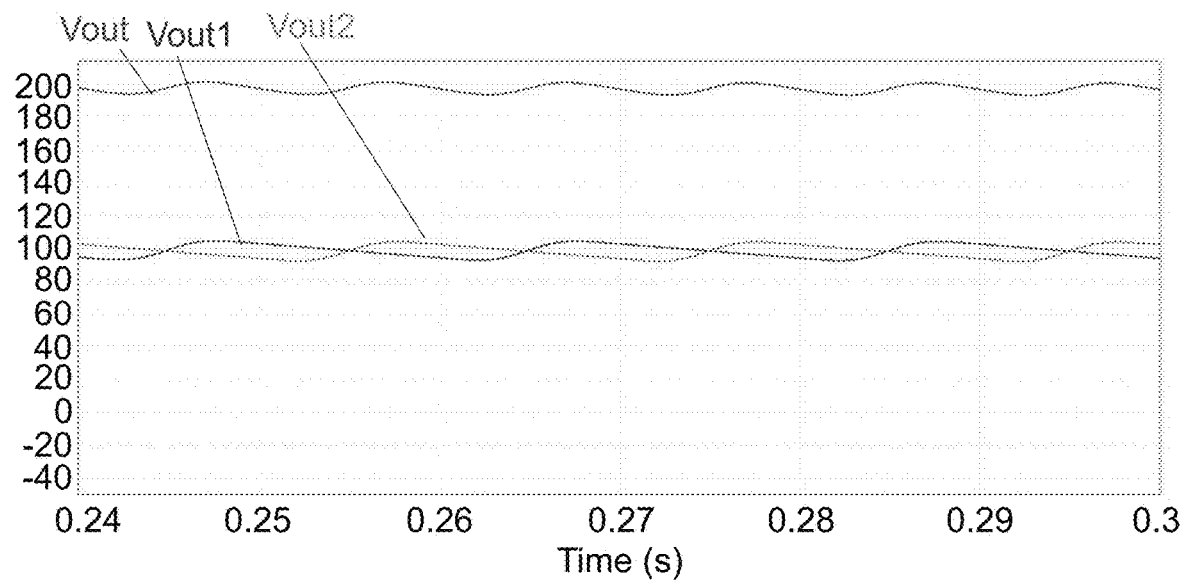
FIG. 8 is a simplified graph showing output capacitor voltage and load voltage in DCM in accordance with embodiments of the present invention.

Reference is now made to FIG. 8, which is a simplified graph showing the DCM mode output capacitor voltage and load voltage. The output ripple voltage of each output capacitor 44, 46, is marked as $v_{out,1}$, $v_{out,2}$ and the sum of both voltage capacitors is equal to the load voltage and marked as $v_{out}$. The output load voltage ripple frequency is 100 Hz while the $v_{out,1}$, $v_{out,2}$ ripple voltage is 50 Hz. The expression for the output voltage ripple in percent is show in (15). The voltage ripple depends on the mains frequency as well as the power, so that when the mains frequency increases the ripple decreases.

$$\Delta v\% = \frac{P_{dc}}{4\cdot f_{grid}\cdot V_{dc}^2\cdot C_{h.up}} \quad (15)$$

Figure 9:
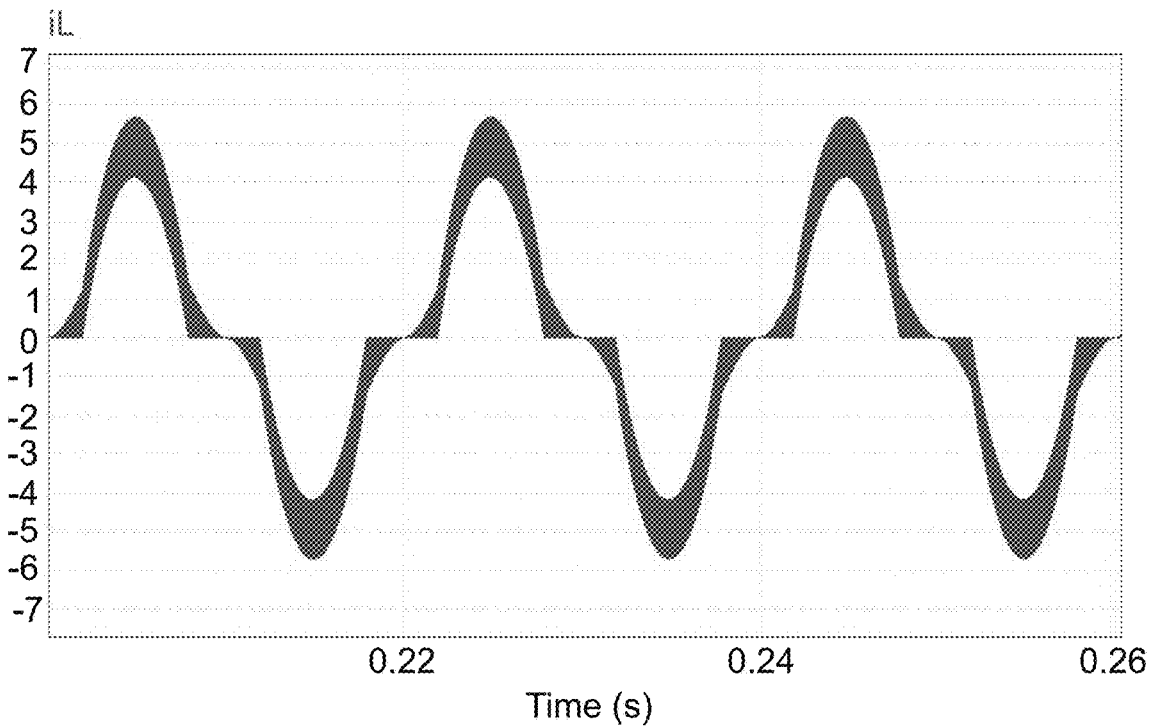
FIG. 9 is a simplified graph showing the envelope of inductor current in CCM in accordance with embodiments of the present invention.

Reference is now made to FIG. 9, which is a simplified graph illustrating the inductor current envelope in the CCM mode. When using a higher value inductor than $L_{Critical}$ the rectifier enters into CCM operation, when the value is lower then the rectifier runs in DCM operation. Although the rectifier runs open loop it presents a PFC capability. Since the rectifier operates in open loop the current zero crossing band is not smooth and slightly disturbs the unity PFC and increases the input current harmonics.

Figure 10:
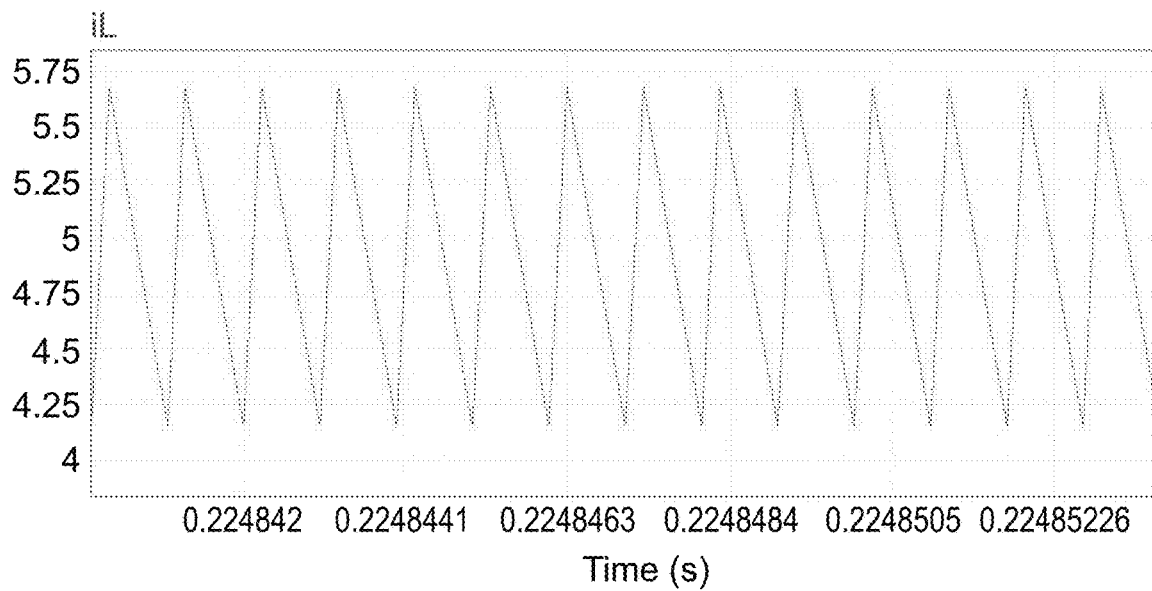
FIG. 10 is a simplified graph showing positive half cycle peak inductor current in CCM in accordance with embodiments of the present invention.

Since the TBPR operates in open loop the positive half cycle maximum inductor ripple current reaches a maximum value at the peak of the sine wave as shown in FIG. 10.

Figure 11:
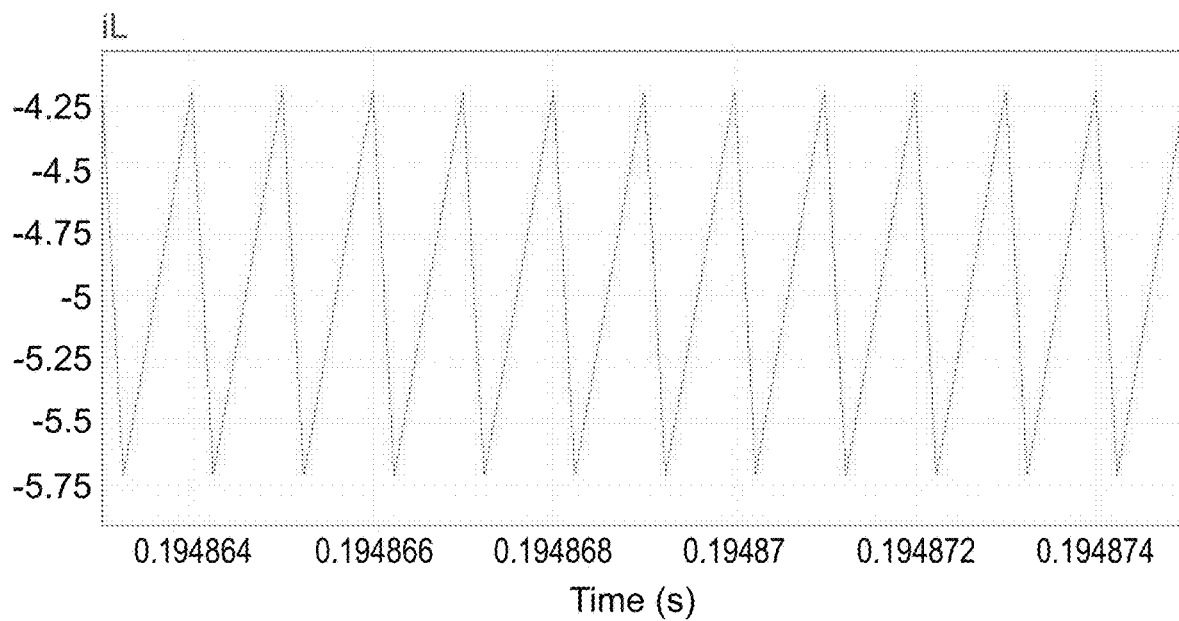
FIG. 11 is a simplified graph showing negative half cycle inductor peak current in CCM in accordance with embodiments of the present invention.

The negative half cycle maximum ripple current is found at the base of the sine wave as shown in FIG. 11.

Figure 12:
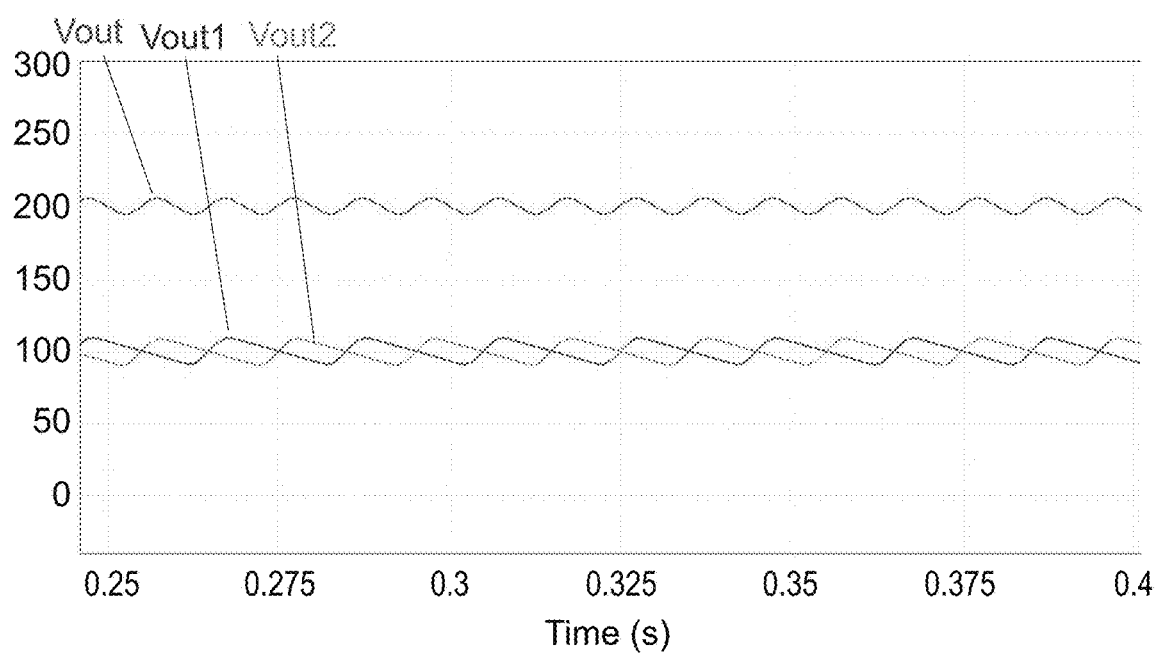
FIG. 12 is a simplified graph showing output capacitor voltage and load voltage in CCM in accordance with embodiments of the present invention.
Figure 13:
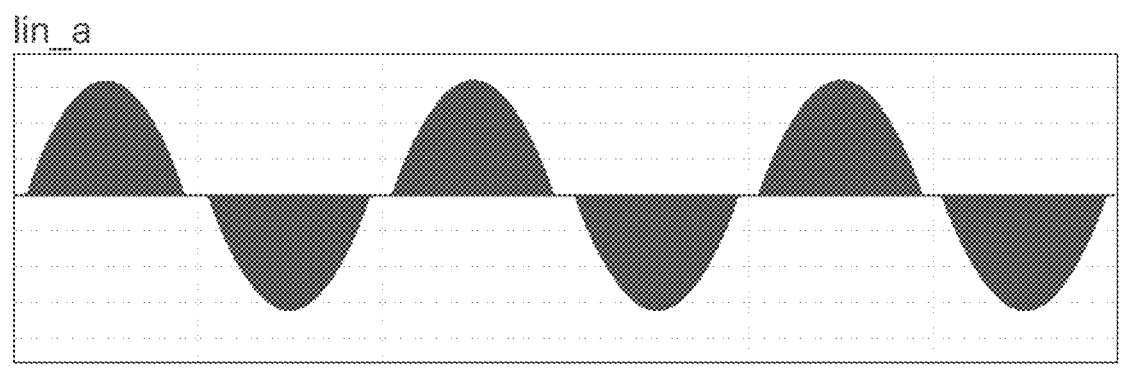
FIG. 13 is a simplified diagram showing the AC source current for CCM.

The output ripple voltage of each of the output capacitors 44, 46 is marked as $v_{out,1}$ $v_{out,2}$ and the sum of both voltage capacitors is equal to the load voltage and marked as $v_{out}$. The output load voltage ripple frequency is 100 Hz while the $v_{out,1}$, $v_{out,2}$ ripple voltage at 50 Hz is shown in FIG. 12.

The present embodiments may provide a rectifier with a small volume and weight that operates at a high frequency that is capable of providing a wide voltage range at an output of 50-430 VDC without harmonics and with a normal power factor. Such rectifiers may be efficiently used for electrical devices that use motors, such as refrigerators, etc.

Figure 14:
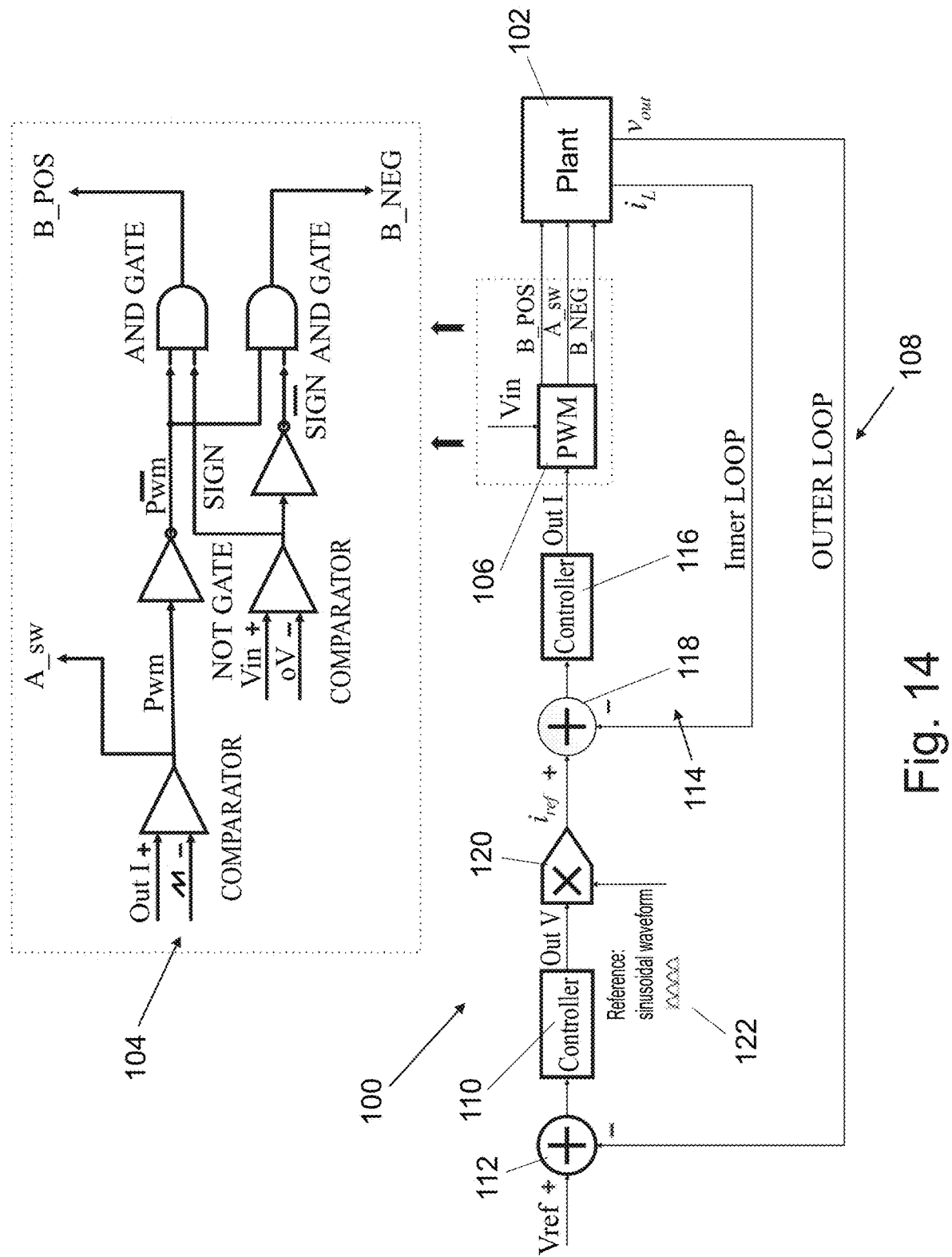
FIG. 14 is a simplified circuit diagram showing a control structure for CCM and illustrating a multiplier for adding a sinusoidal reference signal and circuit logic for a pulse width modulator, for use in accordance with embodiments of the present invention.
Figure 15:
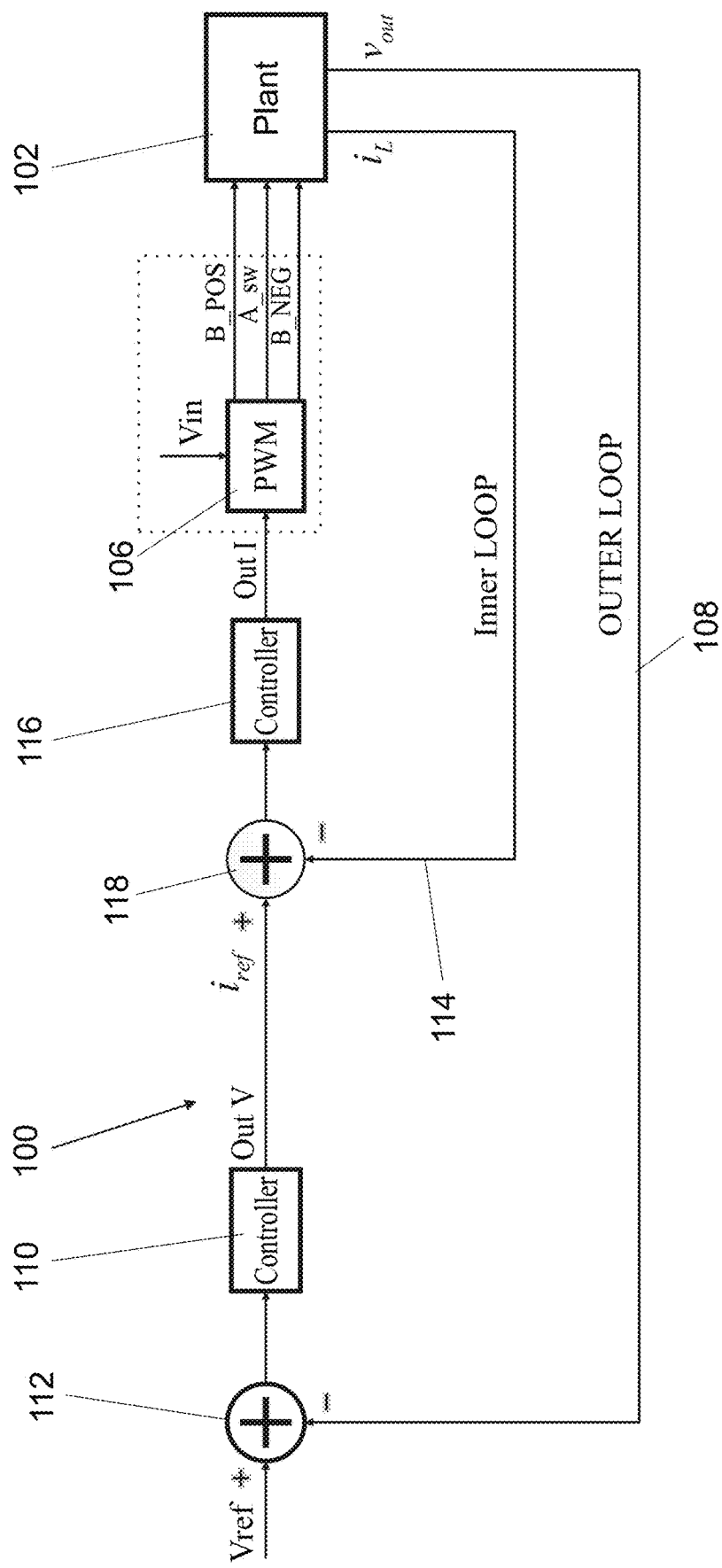
FIG. 15 is a simplified circuit diagram showing a control structure for DCM, in accordance with embodiments of the present invention

Reference is now made to FIGS. 14 and 15, which are two simplified diagrams showing control circuits for a pulse width modulation signal in each of the CCM and DCM modes respectively.

FIG. 14 shows a cascaded control structure 100 for CCM control of plant 102 and insert 104 shows the internal logic of the pulse width modulator PWM 106. The cascaded control structure comprises outer loop 108 built around outer loop controller 110 and adder 112, and inner loop 114 built around inner loop controller 116 and inner loop adder 118. Multiplier 120 multiplies the output of the outer loop controller 110 with reference sinusoidal signal 122.

More particularly, a cascaded control structure for a PFC rectifier is shown in FIG. 14. Usually, the rectifier output voltage is chosen to be stabilized. The outer loop controller 110 generates current reference signal $i_{REF}$, which in the case of average current control corresponds to the inductor current, averaged over one switching cycle. In CCM the control circuit receives the rectifier output voltage, and subtracts the actual voltage from the voltage reference to obtain an error, and then the error is processed in the voltage controller. The output signal of the voltage loop is the reference signal of the inductor current loop. Since the required envelope shape of the inductor current is sine, the current reference is multiplied by sine wave 122. The inductor current, on the inner loop is now subtracted from the new reference signal at adder 118 and the resulting error is processed in the current controller 116 in the inner loop. The output of the current controller (Out I) feeds the PWM generator 106 that is responsible for creating three required signals B_Pos, A_SW and B_Neg using the arrangement of logic gates shown in 104.

FIG. 15 shows a cascaded control structure 100 for CCM control of plant 102. The structure is identical to that of FIG. 14 with inner and outer loops. The sole difference is the absence of multiplier 120 at the output of the outer loop. The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A T-type buck-boost power factor correction (PFC) rectifier (TBPR) for providing a low ripple DC output from a mains AC input, the TBPR comprising:
    a power inductor;
    first and second storage capacitors; and
    first, second and third bi-directional switches, the first bidirectional switch connecting a power supply input to a first end of said power inductor, the second bidirectional switch connecting said first end of said power inductor to a first end of said first capacitor and said third bidirectional switch connecting said first end of said power inductor to a first end of said second capacitor, a second end of said first capacitor, a second end of said second capacitor and a second end of said power inductor being connected to a common node, wherein, when the power inductor is above a critical inductance value, the TBPR operates in a continuous conduction mode, the continuous conduction mode configured to cause a low ripple DC output relative to ripple of an AC input and thereby providing power factor correction.

2. The TBPR of claim 1, wherein the power inductor is below a critical value, the TBPR thereby operating in a discontinuous conduction mode.

3. The TBPR of claim 1, having a first control signal, the first control signal having a complement, wherein the first bidirectional switch is governed by said first control signal and said second bidirectional switch is controlled by said complement of the first control signal, said second bidirectional switch being further constrained to operate only during a positive half of an input sine wave.

4. The TBPR of claim 1, having a first control signal, the first control signal have a complement, wherein the first bidirectional switch is governed by said first control signal and said third bidirectional switch is controlled by said complement of the first control signal, said third bidirectional switch being further constrained to operate only during a negative half of an input sine wave.

5. The TBPR of claim 3, wherein said first control signal is produced by a pulsed width modulation (PWM) module.

6. The TBPR of claim 1, having two voltage output levels.

7. The TBPR of claim 1, having three voltage output levels.

8. The TBPR of claim 1, wherein the output voltage is below 430 volts.

9. The TBPR of claim 1, wherein the output voltage is between 430 volts and 50 volts at a power factor close to unity.

10. A domestic appliance connected to and powered by the DC output of the TBPR of claim 1.

11. A domestic appliance incorporating a T-type buck-boost power factor correction (PFC) rectifier (TBPR) for providing a low ripple DC output from a mains AC input, the TBPR comprising:
    a power inductor;
    first and second storage capacitors; and
    first, second and third bi-directional switches, the first bidirectional switch connecting a power supply input to a first end of said power inductor, the second bidirectional switch connecting said first end of said power inductor to a first end of said first capacitor and said third bidirectional switch connecting said first end of said power inductor to a first end of said second capacitor, a second end of said first capacitor, a second end of said second capacitor and a second end of said power inductor being connected to a common node, wherein, when the power inductor is above a critical inductance value, the TBPR operates in a continuous conduction mode, providing a low ripple DC output relative to ripple of an AC input and thereby providing power factor correction.

12. A method of manufacturing or modifying an electrical appliance to provide a T-type buck-boost power factor correction (PFC) rectifier (TBPR) for providing a low ripple DC output from a mains AC input: the method of manufacturing or modifying comprising:
    providing a power inductor;
    providing first and second storage capacitors; and
    providing first, second and third bi-directional switches;
    connecting a power supply input to a first end of said power inductor via the first bidirectional switch;
    connecting said first end of said power inductor to a first end of said first capacitor via the second bidirectional switch;

connecting said first end of said power inductor to a first end of said second capacitor via said third bidirectional switch; and connecting a second end of said first capacitor, a second end of said second capacitor and a second end of said power inductor to a common node, wherein, when the power inductor is above a critical inductance value, the TBPR operates in a continuous conduction mode, providing a low ripple DC output relative to ripple of an AC input and thereby providing power factor correction.

\* \* \* \* \*